United States Patent [19]

Bielas et al.

[11] Patent Number: 5,410,515

[45] Date of Patent: Apr. 25, 1995

[54] RAPID TURN-ON SOURCE FOR FIBER OPTIC GYROSCOPE

[75] Inventors: Michael S. Bielas; Rudolf C. Dankwort, both of Phoenix, Ariz.

[73] Assignee: Honeywell Inc., Minneapolis, Minn.

[21] Appl. No.: 55,133

[22] Filed: Apr. 29, 1993

[51] Int. Cl.$^6$ .......................................... G01C 19/64
[52] U.S. Cl. ................................. 356/350; 372/38
[58] Field of Search ......................... 356/350; 372/38

[56] References Cited

U.S. PATENT DOCUMENTS

| | | | |
|---|---|---|---|
| 5,018,154 | 5/1991 | Ohashi | 372/38 X |
| 5,043,992 | 8/1991 | Royer et al. | 372/38 |
| 5,272,516 | 12/1993 | Ashizuka | 356/350 |

OTHER PUBLICATIONS

E. Udd, et al., "Scale Factor Correction in the Phase-Nulling Optical Gyro", Fiber Optic and Laser Sensors II, Proc.SPIE vol. 478, pp. 136-141 (1982).
G. Schiffner, et al., "Fiberoptic Rotation Sensor: Analysis of Effects Limiting Sensitivity & Accuracy", Fiber Optic Rotation Sensors and Related Technologies, pp. 226-274 (1982).
M. S. Bielas, et al., "Test Results of a High Performance Fiber-Optic Rotation Sensor", Fiber Optic Gyros: 10th Anniversary Conference, Proc. SPIE vol. 719, pp. 81-86 (1986).
R. Y. Liu, et al., "Progress Toward an Inertial Grade Fiber Optic Gyroscope", Proceedings of the National Technical Meeting, The Institute of Navigation, pp. 251-255 (1989).

*Primary Examiner*—Vincent P. McGraw
*Attorney, Agent, or Firm*—John G. Shudy, Jr.

[57] ABSTRACT

A light source with wavelength compensation for a fiber optic rotation sensor includes a light source to provide light for input to the fiber optic rotation sensor. A source control circuit generates a source control signal representative of the temperature of the light source. A driver generates a drive signal as a function of the source control signal to drive the light source. One of a plurality of scale factors for the fiber optic rotation sensor is generated also as a function of the source control signal over a predetermined temperature range. The source control circuit includes a temperature sensor which provides a current signal representative of the temperature of the light source and a buffer network for sinking the current signal and for generating a source control voltage as the source control signal. A method for wavelength compensation of a light source for a fiber optic rotation sensor includes sensing a temperature of the light source and generating a source control signal representative of the temperature. A drive signal is applied to the light source as a function of the source control signal and a scale factor for the fiber optic rotation sensor is generated as a function of the compensation signal.

13 Claims, 7 Drawing Sheets

RAPID TURN-ON SOURCE FOR FIBER OPTIC GYROSCOPE

FIELD OF THE INVENTION

The present invention relates to fiber optic gyroscope light sources. In particular, the present invention relates to a rapid turn-on light source with wavelength compensation for improving scale factor performance of a fiber optic gyroscope.

BACKGROUND OF THE INVENTION

One of the major advantages of fiber-optic gyroscope technology is that it offers the potential of a low-cost, all-solid-state approach with long-lifetime and high-reliability advantages over current gyroscopes. In order for these advantages to materialize, it is imperative that the fiber-optic gyroscopes have scale factor correction of 100 ppm or better, although exact requirements on scale factor are dependent on the application desired. Scale factor correction to this accuracy implies that elements which change the scale factor relationship must be monitored to a corresponding accuracy. One such element to be monitored is the output wavelength of the light source of the fiber optic gyroscope to an accuracy compatible with application requirements. Since the output of the light source of fiber optic gyroscopes depends on temperature and light source drive current in an unpredictable manner, a means to compensate or eliminate this scale factor error source is required.

For an open loop fiber optic gyroscope, the relationship between the detected output of the gyroscope and the rotation rate $\Omega$ is shown as follows. The detected output when phase sensitively demodulated, as is known in the art, is shown by $$\text{output} = K \sin\left(\frac{2\pi LD}{\lambda c} \Omega\right) \text{ or } K \sin \Delta\phi_s$$

where K is approximately proportional to $I_o$, the input intensity, $\lambda$ is the wavelength of the light source, c is the speed of light in a vacuum, $\phi_s$ is the Sagnac phase shift between the counterpropagating waves, L is the length of the fiber, D is the coil diameter, and $\Omega$ is the angular rotation rate. When the rotation rate is small or is linearized, such as by an inverse sine function, the relationship is represented by $$\Omega = \frac{\lambda c \phi_s}{2\pi LD}$$

The scale factor (SF) for the open loop gyroscope is rewritten as $$SF = \frac{\lambda c}{2\pi LD}$$

In a closed loop configuration, the output is utilized as an error signal for feedback, possibly using serrodyne concepts as are known to those skilled in the art. The relationship between the output of such a closed loop fiber optic gyroscope and rotation rate can be expressed in the form $$\Omega = \left[\frac{\lambda n}{D}\right] \Delta F$$

where n is the index of refraction of a fiber coil of the fiber optic gyroscope, $\lambda$ is the wavelength of a light source of the fiber optic gyroscope, D is the diameter of the fiber coil, and $\Delta F$ is the frequency difference between counterpropagating waves of the fiber optic gyroscope. The scale factor for determining the rotation rate $\Omega$ can therefore be rewritten as $$SF = \left[\frac{\lambda n}{D}\right]$$

As shown by the above equations, in both the open loop and closed loop configurations, wavelength $\lambda$ needs to be controlled or compensated to compensate or correct scale factor. Since the wavelength of the light source varies with temperature, current, and other parameters, a change in scale factor is difficult to monitor and thus such a change is difficult to compensate or eliminate as is required for scale factor stability.

Such a change in scale factor can be approximated in accordance with the equation $$\frac{\Delta SF}{SF} \equiv \frac{1}{\lambda} \frac{d\lambda}{dT_s} \Delta T_s + \frac{1}{\lambda} \frac{d\lambda}{dI_f} \Delta I_f +$$

$$\frac{1}{n} \frac{dn}{dT_c} \Delta T_c - \frac{1}{D} \frac{dD}{dT_c} \Delta T_c$$

for a closed loop configuration, and $$\frac{\Delta SF}{SF} \equiv \frac{1}{\lambda} \frac{d\lambda}{dT_s} \Delta T_s + \frac{1}{\lambda} \frac{d\lambda}{dI_f} \Delta I_f +$$

$$\frac{1}{L} \frac{dL}{dT_c} \Delta T_c - \frac{1}{D} \frac{dD}{dT_c} \Delta T_c$$

for a open loop configuration, where SF is the scale factor, $\lambda$ is the wavelength, $T_S$ is the source temperature, $I_f$ is the source drive current, n is the coil's index of refraction, $T_c$ is the fiber coil temperature, L is the fiber length, and D is the effective diameter of the fiber coil. As is seen by the above equations, the temperature dependence of the scale factor is given by the temperature dependence of L, D, n and $\lambda$, with the change in wavelength $\lambda$ being the dominant term.

As suggested in the article, "Scale Factor Correction in the Phase-Nulling Optical Gyro", by E. Udd R. J. Michal and R. F. Cahill, *Fiber Optic and Laser Sensors II*, Proc. SPIE, Volume 478, pp. 136–141 (1982), the change in wavelength of the light source which varies with temperature, current and other parameters is monitored by tracking a separation in frequency between adjacent fringes of the gyroscope which depends on the wavelength of the systems light source. As the wavelength is then determined therefrom, the change in wavelength can be utilized to correct scale factor.

The article, "Fiber Optic Rotation Sensor: Analysis of Effects Limiting Sensitivity and Accuracy," by G. Schiffner, B. Nottbeck, and G. Schoner, *Fiber-Optic Rotation Sensors and Related Technologies*, pp. 266–274 (1982), discusses the stability of scale factor and the effects causing scale factor changes. One such effect is the change of laser wavelength from the source. It is indicated that the wavelength must be sensed and a correction of scale factor must be made for wavelength. The article indicates that such laser wavelength changes must be taken into account in the data processing unit for the fiber optic gyroscope and that if the wavelength is a function of temperature only, a temperature sensor would be sufficient. If the wavelength is a function of more than temperature, a means of measuring the wavelength must be provided to allow for correction of scale factor.

Figure 2:
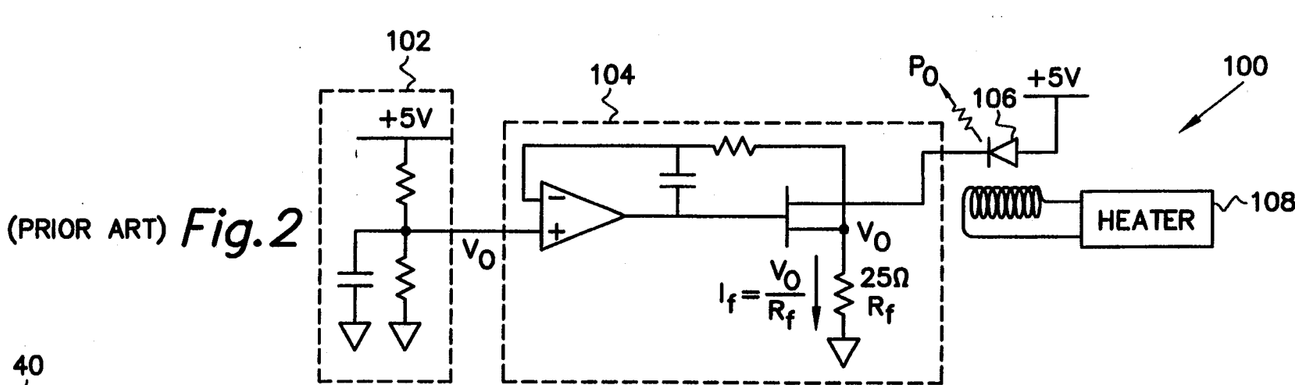
FIG. 2 is a prior art light source.

FIG. 2 shows a prior art light source 100 which includes a voltage source 102 for providing an input $V_0$ to an operational amplifier of a source driver 104. The source driver 104 forces the input $V_0$ to be the output of the source driver 104 and drives the laser diode 106 having a power output $P_0$ with a drive current $I_F$ substantially equal to $V_0/R_F$. A heater 108 attempts to stabilize the laser diode 106 at a particular temperature. Often, a thermoelectric cooler is used to stabilize the temperature.

In accordance with the discussion above, a change in the laser diode wavelength has the effect of causing a scale factor change which without compensation will produce an inaccurate rotation rate output. Methods for compensating for such wavelength changes of the light source attempt to measure the wavelength change or sense a temperature change only while failing to recognize wavelength dependence on source current. Therefore, there is a need for an alternative source having wavelength compensation to improve scale factor performance. Such a source should be available under all startup temperatures without damaging the light source.

SUMMARY OF THE INVENTION

The present invention provides a rapid turn-on source with wavelength compensation for improving scale factor performance in a fiber optic rotation sensor. The rapid turn-on source includes a light source to provide light input to the fiber optic rotation sensor. A source control circuit generates a source control signal representative of the temperature of the light source. A driver generates a drive signal as a function of the source control signal to drive the light source and one of a plurality of scale factors is generated for the fiber optic rotation sensor as a function of the source control signal over a predetermined temperature range.

In one embodiment of the invention, the source control circuit includes a temperature sensor that provides a current signal representative of the temperature of the light source and a buffer network for sinking the current signal and generating a source control voltage as the source control signal. The buffer network includes a buffer that has an output with a first selected impedance connected between the output and an input of the driver and a non-inverting input having a selected voltage applied thereto. The source control voltage is substantially equal to a voltage across the first selected impedance as the current signal is sunk in the buffer and the selected voltage.

In another embodiment of the invention, the driver which includes the input for receiving the compensation voltage, also includes a circuit for forcing and providing the compensation voltage at an output of the driver and across a second selected impedance connected to ground to generate a drive current as the drive signal for driving the light source. The first and second selected impedances and the selected voltage are determined as a function of predetermined first and second set point temperatures which define the predetermined temperature range and predetermined drive currents for the set point temperatures.

In another embodiment of the invention, the scale factor is generated with an analog to digital converter which converts the source control signal to a digitized signal. One of a plurality of scale factors based on a plurality of temperatures of the light source for a plurality of rotation rates of the fiber optic rotation sensor is generated by a computer as a function of the source control signal.

In another embodiment of the invention, the light source is substantially immediately turned on by the drive signal upon excitation of the light source. The source control circuit prevents the drive signal from exceeding a predetermined safe maximum current whether the light source is at a low temperature or high temperature of the predetermined temperature range.

A method of light source wavelength compensation for a fiber optic rotation sensor also is described which includes providing a light source and sensing a temperature of the light source. A source control signal representative of the temperature is generated. A drive signal is applied to the light source as a function of the source control signal and a scale factor for the fiber optic rotation sensor is generated as a function of the source control signal.

DESCRIPTION OF THE PREFERRED EMBODIMENT

Figure 1:
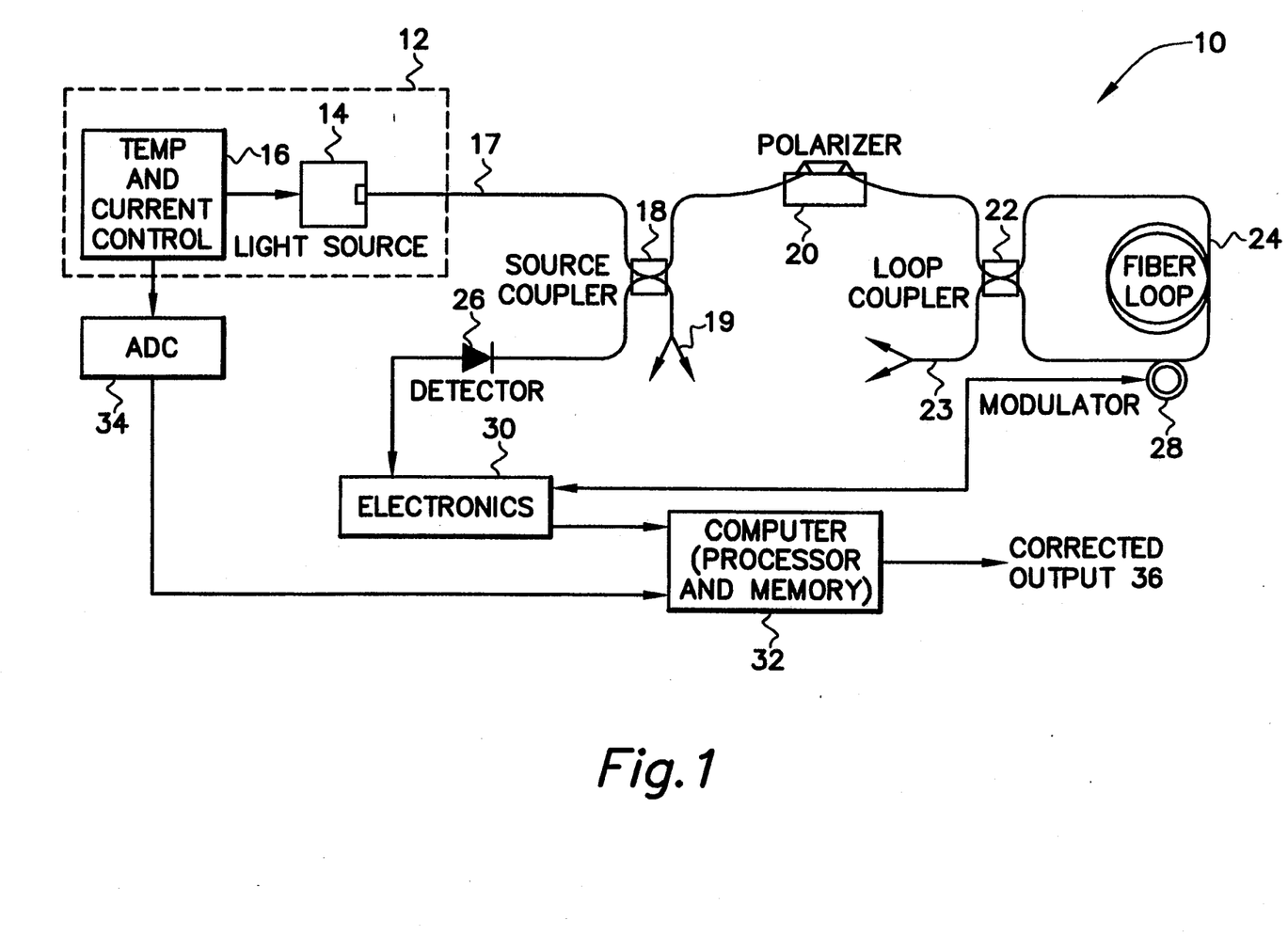
FIG. 1 is a fiber optic gyroscope having input from a light source in accordance with the present invention.

A rapid turn-on light source 12 in accordance with the present invention is shown in FIG. 1 as the light source for fiber optic gyroscope 10. Rapid turn-on light source 12 includes temperature and current control circuitry 16 for driving a laser diode 14 to introduce light into an optical fiber 17. Light input to the fiber 17 then propagates to source coupler 18 where the source coupler 18 couples a portion of the light to polarizer 20 while a portion of the light is lost through the non-reflecting ends 19 of the source coupler 18. The light propagates from the polarizer to loop coupler 22 where it is split into two counter-propagating waves; the first wave propagating in a clockwise direction around a fiber loop 24 and the second wave propagating in a counterclockwise direction around fiber loop 24. Phase modulator 28 provides frequency modulation as is known to one skilled in the art. After the waves have traversed the fiber loop 24, they are recombined by coupler 22 to form an optical output signal which propagates from the coupler 22 to source coupler 18 with a portion of the optical output signal lost through non-reflecting ends 23 of the loop coupler 22. A portion of the optical output signal is then coupled from the source coupler 18 for propagation to detector 26. The detector 26 outputs an electrical signal which is proportional to the intensity of the light impressed thereon by the optical output signal.

The intensity of the optical output signal will vary in accordance with the amount and type of interference between the counterpropagating waves when they are recombined or superimposed at the loop coupler 22. When the fiber loop 24 is rotated, the counterpropagating waves will be shifted in phase, in accordance with the Sagnac effect, so that when they are superimposed at the coupler 22 they interfere producing a Sagnac phase difference between the waves caused by rotation of fiber loop 24, as is known to one skilled in the art. The intensity of the optical output signal as detected by detector 26 is an effect of the rotation rate of the fiber optic gyroscope; thus, an indication of such rotation rate may be obtained by measuring the intensity of the output signal.

If it is assumed that the only source of phase difference between the counterpropagating waves is the rotation of fiber loop 24, then rotation $\Omega$ for a closed loop fiber optic gyroscope can be shown in accordance with the following relationship with $\Delta F$ being the frequency difference representative of phase shift.

$$\Omega = \left[\frac{\lambda n}{D}\right]\Delta F$$

The scale factor SF is shown by $$SF = \left[\frac{\lambda n}{D}\right]$$

For an open loop fiber optic gyroscope, rotation rate $\Omega$ rotation rate is shown by the relationship $$\Omega = \frac{\lambda c \phi s}{2\pi LD}$$

and scale factor $\underline{SF}$ is $$SF = \frac{\lambda c}{2\pi LD}$$

However, without a stable scale factor or means for compensating the scale factor for variation in wavelength according to different parameters such as temperature, source drive current, etc. accurate fiber optic gyroscope measurements cannot be achieved. The rapid turn-on light source 12, in addition to the analog to digital converter 34 and computer 32, provides a means to compensate for a change in wavelength and improve scale factor performance to achieve such accuracy. In addition, the rapid turn-on light source 12 maintains substantially a constant source power output intensity within the range of 1 to 2 db over a predetermined temperature range. By maintaining such constant power output intensity, the light source 12 is prevented from being damaged by exceeding rating limits of the source circuitry and random noise is kept substantially constant versus temperature. In addition, by maintaining the substantially constant power output intensity, the light source wavelength spectrum is kept substantially constant which in turn increases bias stability.

Figure 3:
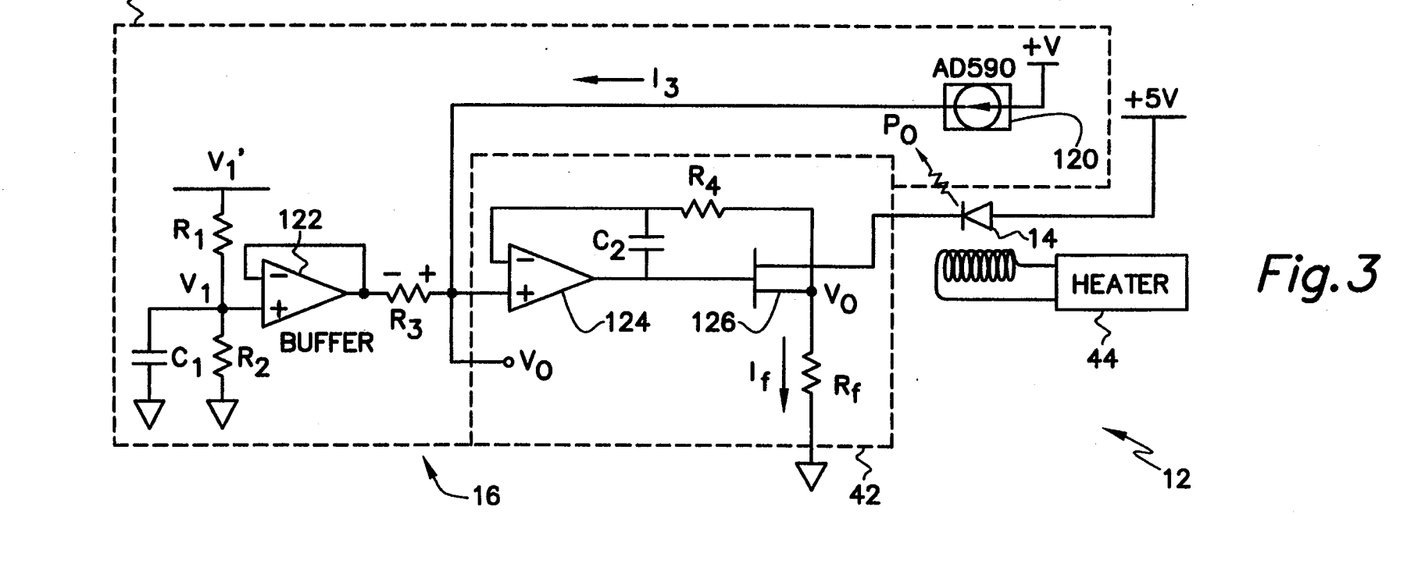
FIG. 3 is a schematic diagram of the light source of FIG. 1 in accordance with the present invention.
Figure 4:
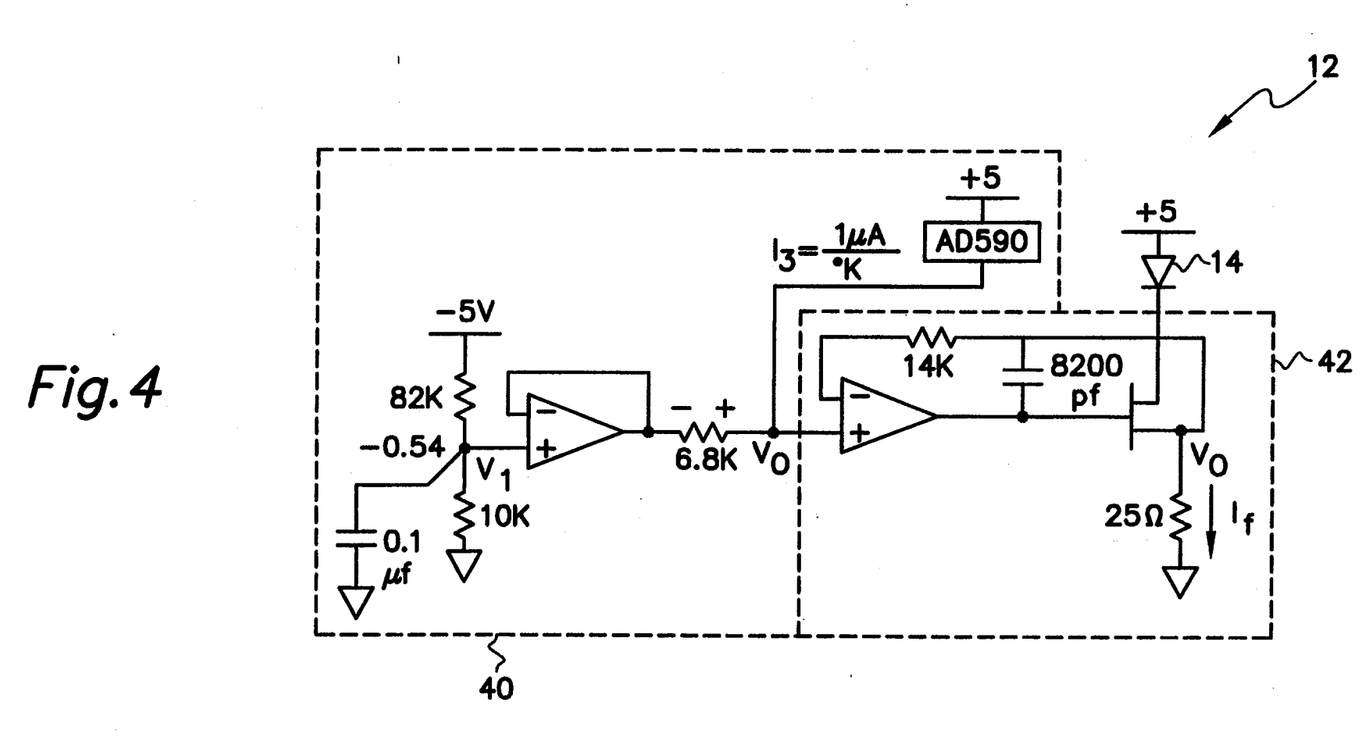
FIG. 4 is a schematic diagram of one implementation of the light source as shown in FIG. 3.

With reference to FIGS. 3 and 4, the rapid turn-on light source 12 in accordance with the present invention shall be described. Rapid turn-on light source 12 includes temperature and current control circuitry 16, laser diode 14, and heater 44. Temperature and current control circuitry 16 includes voltage control circuitry 40 which generates voltage $V_0$ for input to source driver 42. Source driver 42 forces $V_0$ to appear at the output of the source driver 42 providing source current $I_F$ to drive laser diode 14.

Voltage control circuitry 40 includes a temperature sensor 120, an AD590 temperature sensor, which is in thermal contact with laser diode 14 to measure the temperature of the laser diode 14 as it heats up due to the heater 44 and/or its self heating power. Heater 44 may contribute to temperature stability of the system; however, the heater is not essential as the light source 12 allows the temperature of the diode 14 to float over a predetermined temperature range without performance degradation, as shall be discussed further below. In addition, a thermo-electric cooler could be used to stabilize temperature. The AD590 temperature sensor available from Analog Devices, Inc., Norwood, Mass. 02062, is close to an ideal current source and a current $I_3$ is generated upon excitation of the light source 12 almost immediately upon turn-on. One skilled in the art will recognize that any current source which approximates the functioning of an AD590 temperature sensor can be used to sense the temperature of the laser diode 14 and produce a signal in accordance therewith.

The temperature sensor 120 generates a current $I_3$ which flows through $R_3$ and is sunk in the low impedance of a buffer operational amplifier 122. The current $I_3$ serves to set the voltage $V_0$ as a function of temperature since current $I_3$ varies $1\mu$ amp/K. In other words, $I_3$ is approximately $300\mu$ amps at 300K. The variation of temperature sensor current $I_3$ is such that the voltage $V_0$ is lower when the device is cooler and higher when the device is hotter.

The voltage control circuitry 40 further includes a voltage network including $V_1'$, $R_1$, $R_2$ and $C_1$ for generating a voltage $V_1$ to be selected in accordance with the description provided below. As such, $V_o$ can be represented by the equation $$V_0 = V_1 + R_3 I_3(T_S)$$

wherein the temperature sensor current $I_3$ is a function of the temperature $T_S$ of the laser diode 14.

The voltage $V_0$ is applied to the source driver 42 at a non-inverting input of operational amplifier 124. The source driver 42 includes a power field effect transistor (FET) 126 having its gate connected to an output of operational amplifier 124 and its drain and source connected to laser diode 14 and ground through resistor $R_f$, respectively. The source driver 42 forces voltage $V_0$ to appear at the output of the power FET and across resistor $R_f$. Feedback from the source by way of the resistor $R_4$ and capacitor $C_2$, enforces such a desired output. The source driver 42 drives the laser diode 14 with a source drive current $I_f$ equal to $V_0/R_f$.

As is shown and shall be described with reference to FIG. 4, with the selection of $V_1$, $R_3$, and $R_f$, a temperature range having a high and low set point temperature can be selected for the light source wherein scale factor stability and bias stability can be achieved while still allowing fast turn-on with a safe i.e., not overrated, source drive current $I_f$. The proper source coherence function can also be achieved over this temperature range as well. With the drive current $I_f$ given by the relationship $$I_f(T_s) = \frac{V_1 + R_3 I_3(T_s)}{R_f}$$

and letting $R_f$ equal to 25 ohms, two temperature set points and associated source drive currents can be chosen to produce a fast turn-on source in accordance with the present invention over a predetermined temperature range. As will be apparent to one skilled in the art, any temperature range can be selected in accordance with the particular design involved and this particular invention is not limited to the temperature range as described herein.

By selecting the uppermost set point of the source drive current at 55° C. to be $$I_f(55° C.)=68 mA, I_3(55° C.)=328\mu A,$$

and the lower set point of the source drive current at 0° C. to be $$I_f(0° C.)=53mA, I_3(0° C.)=273\mu A,$$

two equations with two unknowns can be solved as shown by the following relationships $$R_3 = \frac{R_f[I_f(0° C.) - I_f(55° C.)]}{-[I_3(55° C.) - I_3(0° C.)]} = 6.8K$$

$$V_1 = R_f I_f(0° C.) - R_3 I_3(0° C.) = -0.54V$$

To achieve $V_1 = -0.54$ volts for input to buffer 122 a simple voltage divider can be utilized. As such, $R_1$ is equal to approximately 82K ohms and R2 is equal to approximately 10K ohms with a $-5V$ supply voltage. Capacitor $C_1$ is equal to about 0.1 $\mu f$.

In prior art light sources when the source is cold, transient voltages at startup may damage the source circuitry. The rapid turn-on light source 12 of the present invention has source drive current $I_f$ equal to $V_o/R_3$ at turn-on because the AD590 temperature sensor 120 is extremely fast and temperature sensor current $I_3$ is sunk in buffer 122 before the voltage $V_1$ has reached $-0.54$ volts. As such, damaging currents can be avoided by appropriate selection of the selected impedances and voltages to keep the source drive current $I_f$ from exceeding the maximum rated $I_f$ for the laser diode 14. In accordance with the light source 12 implementation of FIG. 4, and at the worst case situation with $V_1=0$, at $T_S=0°$ C., $I_3=273\mu A \Rightarrow V_0=1.86V \Rightarrow I_f=74mA$ at $T_S=55°$ C., $I_3=328\mu A \Rightarrow V_0=2.23V \Rightarrow I_f=89mA$ Since $I_f$ max is equal to 150 mA, the maximum source drive current $I_f$ for the laser diode 14 is not exceeded and when $V_1$ has reached $-0.54$ volts a stable rapidly turned-on source is achieved.

The rise time for $V_1$ to reach $-0.54V$ is approximately 100 milliseconds. After 100 milliseconds, the maximum source drive current $I_f$ at $T_S=0°$ C., $I_3=273\mu A \Rightarrow V_0=1.32V \Rightarrow I_f=53mA$ at $T_S=55°$ C., $I_3=328\mu A \Rightarrow V_0=1.69V \Rightarrow I_f=68mA$ $$\left( e.g.\ I_f = \frac{(273\ \mu A)(6.8K) - 0.54V}{25\Omega} = 53\ mA \right)$$

As described above, the voltage $V_0$ generated by voltage control circuit 40 utilizing temperature sensor 120, is representative of the light source's temperature $T_S$ and a source drive current $I_f$. In the Background of the Invention section, the change in scale factor due to the changing wavelength of the light source was dependent upon change in temperature of the source $\Delta T_S$ and change in source drive current $\Delta I_f$, along with other parameters of less importance. Because $V_0$ is representative of the source's temperature $T_S$ and drive current $I_f$, a change in $V_0$ also indicates a change in scale factor. Therefore, the voltage $V_0$ utilized for driving the laser diode 14 via source drive current $I_f$ can also be utilized to correct for scale factor changes as shall be described in further detail below.

In accordance with FIG. 1, $V_0$ is applied to an analog to digital converter 34. The voltage $V_0$ is digitized and the digitized $V_0$ is applied to computer 32 to be processed for scale factor correction. Computer 32 includes a processor and memory for generating the appropriate scale factor to apply to the frequency difference of the counterpropagating waves detected by detector 26 and processed by electronics 30. The electronics 30 may include a demodulator, amplifiers and other necessary electronics; such electronics are known to one skilled in the art. Computer 32 applies a scale factor to the frequency difference or phase shift to determine a corrected rotation rate output 36 or angle output $\alpha$ being the integral of the rate output over time.

Figure 5:
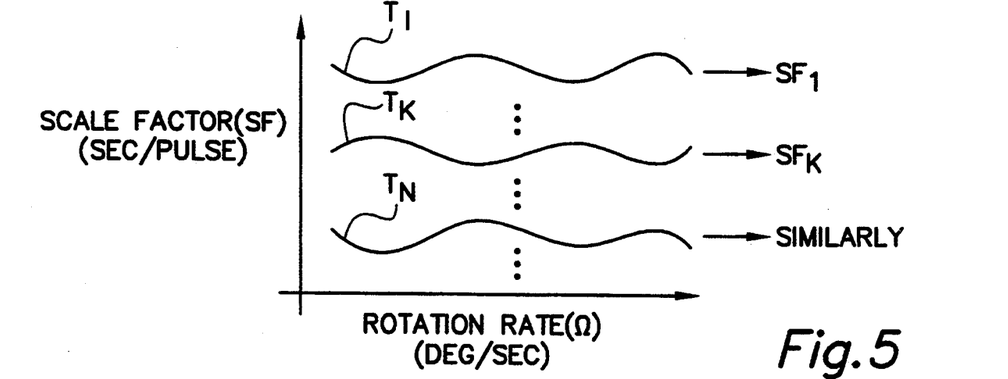
FIG. 5 and FIG. 6 are graphical representations utilized in the method of calculating scale factor correction from rotation rate and a control signal generated by the light source as shown in FIG. 3.

To compute the scale factor as a function of $V_0$, two methods are described. First, in a more general method, as shown in FIG. 5, the fiber optic gyroscope is characterized at various fiber optic gyroscope soak temperatures. The source temperature will float in correspondence with the soak temperatures. With the voltage $V_0$ being representative of the source temperature $T_S$ and the source drive current $I_f$ at various soak temperatures $T_1$, $T_K$, $T_n$, the scale factors for various rotation rates result as shown in FIG. 5. For example, scale factor $SF_1$ may be represented as follows:

$$SF_1=a_1[V_0(T_1,I_1)]+b_1[V_0(T_1,I_1)]\Omega+c_1[V_0(T_1,I_1)]\Omega^2+$$

and scale factor $SF_K$ may be represented as follows:

$$SF_K=a_K[V_0(T_K,I_K)]+b_K[V_0(T_K,I_K)]\Omega+c_K[V_0(T_K,I_K)]\Omega^2+$$

wherein $T_K$ is equal to the Kth source temperature, $I_K$ is equal to the Kth source drive current, and $a_1$, $b_1$, $c_1$, etc. are functions of $V_0$ which is a function of source temperature $T_S$ and drive current $I_f$.

Figure 6:
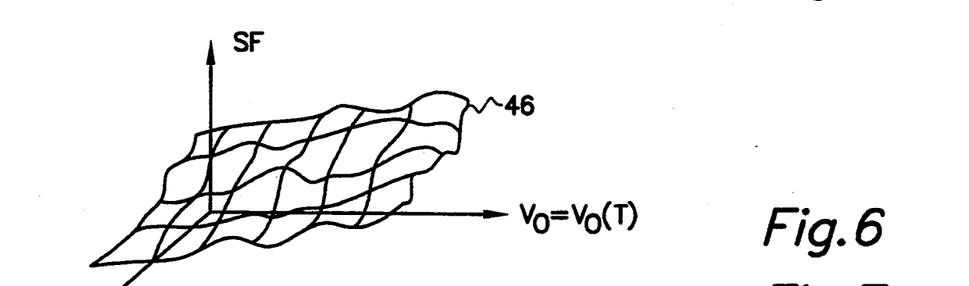

As shown in FIG. 6, such scale factor equations produce a complicated 3-D surface 46 which can be used to recover the scale factor given the rotation rate which is obtainable from navigation and computer calculation and the measured $V_0$ from the light source. Although a continuous grid is shown in FIG. 6, data is generally taken at discrete points and interpolation is done using standard means, as is known to one skilled in the art. Therefore, $V_0$ which is representative of temperature and drive current can be used directly with a known rotation rate from navigation and computer calculation to select an accurate scale factor. This method assures both good scale factor linearity and good scale factor repeatability.

Figure 7:
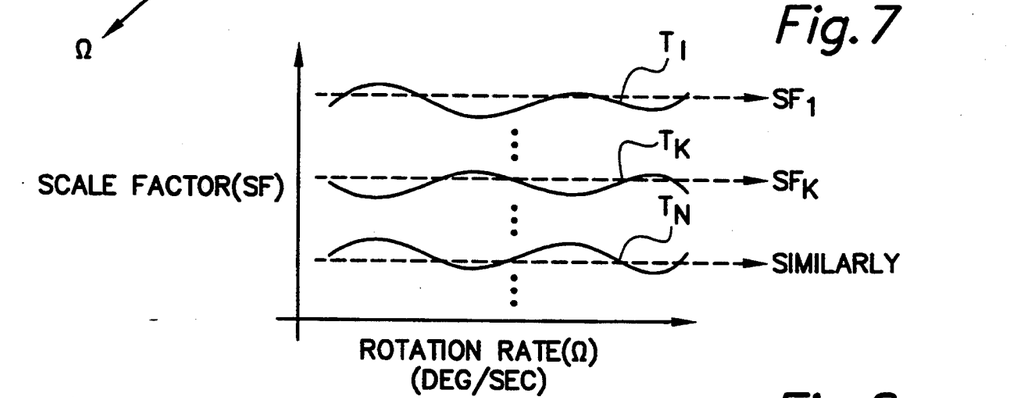
FIG. 7 and FIG. 8 are graphical representations utilized in the method of determining scale factor correction from a control signal generated by the light source in accordance with FIG. 3.

In a second method of linking $V_0$ with scale factor, the fiber optic gyroscope is characterized at various fiber optic gyroscope soak temperatures as shown in FIG. 7; those temperatures being $T_1$, $T_K$, $T_n$. However, in the second method, an average scale factor as shown in FIG. 7 is computed. For example, the average scale factor SF1 is represented by $$SF_1 = a_1[V_0(T_1, I_1)] = a_1$$

and scale factor $SF_K$ is represented as $$SF_K = a_K[V_0(T_K, I_K)] = a_K.$$

Neither of the scale factors is rate dependent because the average scale factor is computed.

Figure 8:
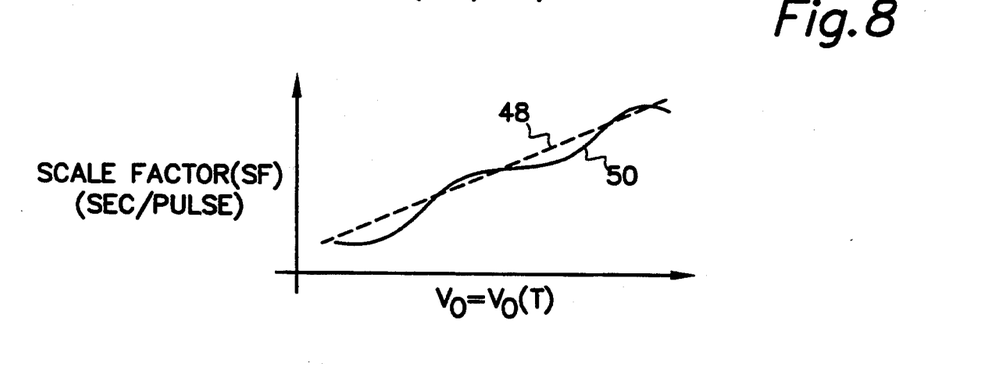

Then, as shown in FIG. 8, the temperature dependence of $V_0$ is applied and a least squares curve fit 48 for the curve 50 is determined. The least squares curve fit may be shown as $$SF = A + BV_0 + CV_0^2 +$$

Although more than a first order equation may be used, for simplicity, only the A and B terms of the above equation are utilized and the scale factor versus $V_0$ which is dependent on temperature and drive current can be shown by line 48. The data arrived at is discrete but is shown in FIG. 8 as continuous. The second method gives good scale factor repeatability, but scale factor linearity depends on variations ignored in the scale factor versus rotation rate curve.

As shown in FIG. 1, the memory of computer 32 may include an algorithm in accordance with the equations above for determining scale factor from $V_0$ upon application of the digitized voltage $V_0$ by analog to digital converter 34 to computer 32. A proper scale factor is computed utilizing computer 32 and applied to the detected output. As such, the corrected scale factor rotation rate output 36 is generated. Likewise, as is known to one skilled in the art, the scale factors for various values of $V_0$ could be calculated and a look-up table utilized, which implies that an algorithm can also be utilized, for selecting the proper scale factor in accordance with $V_0$.

Figure 9A:
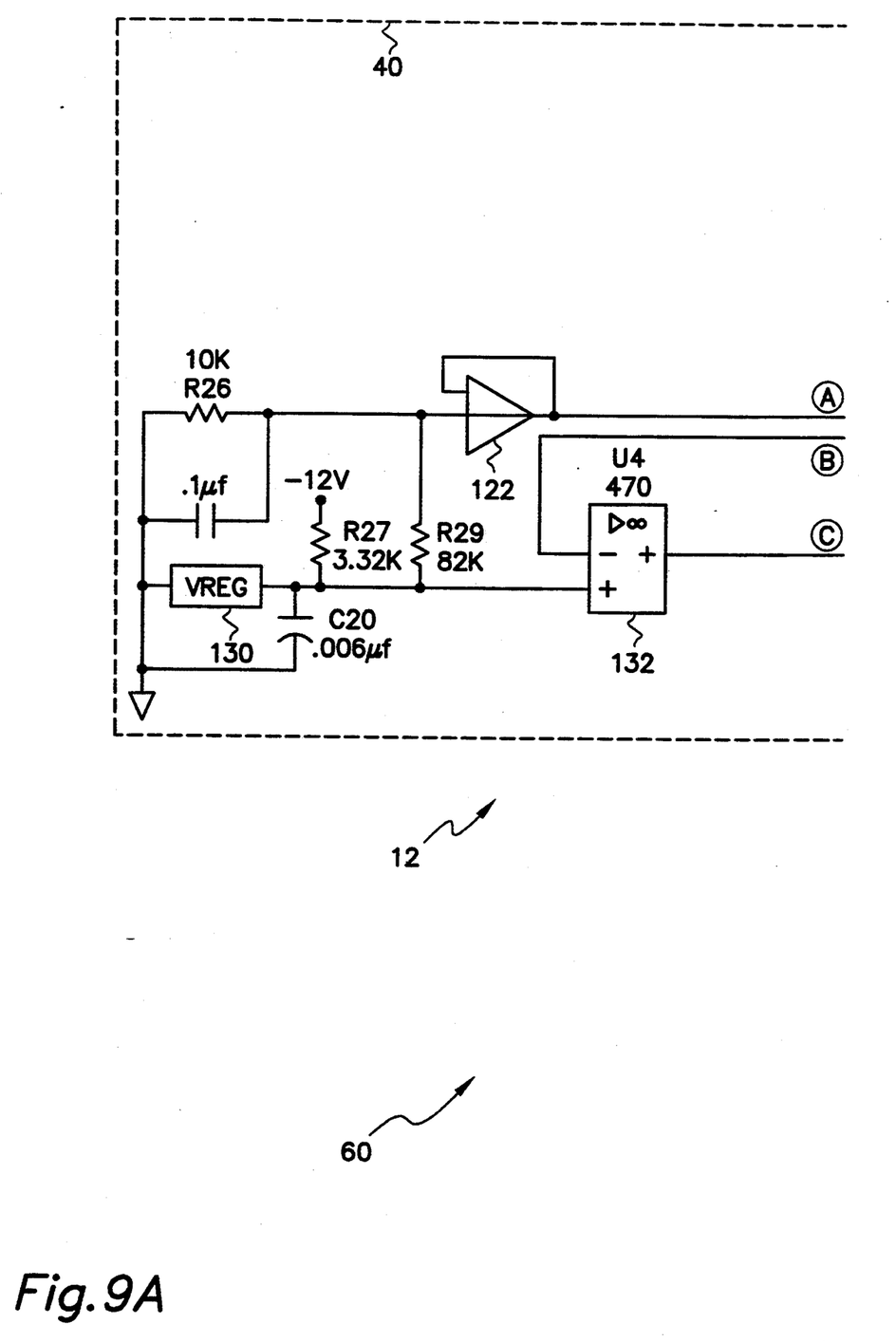
FIG. 9 is an additional schematic implementation of the light source of FIG. 3 in accordance with the present invention.
Figure 9B:
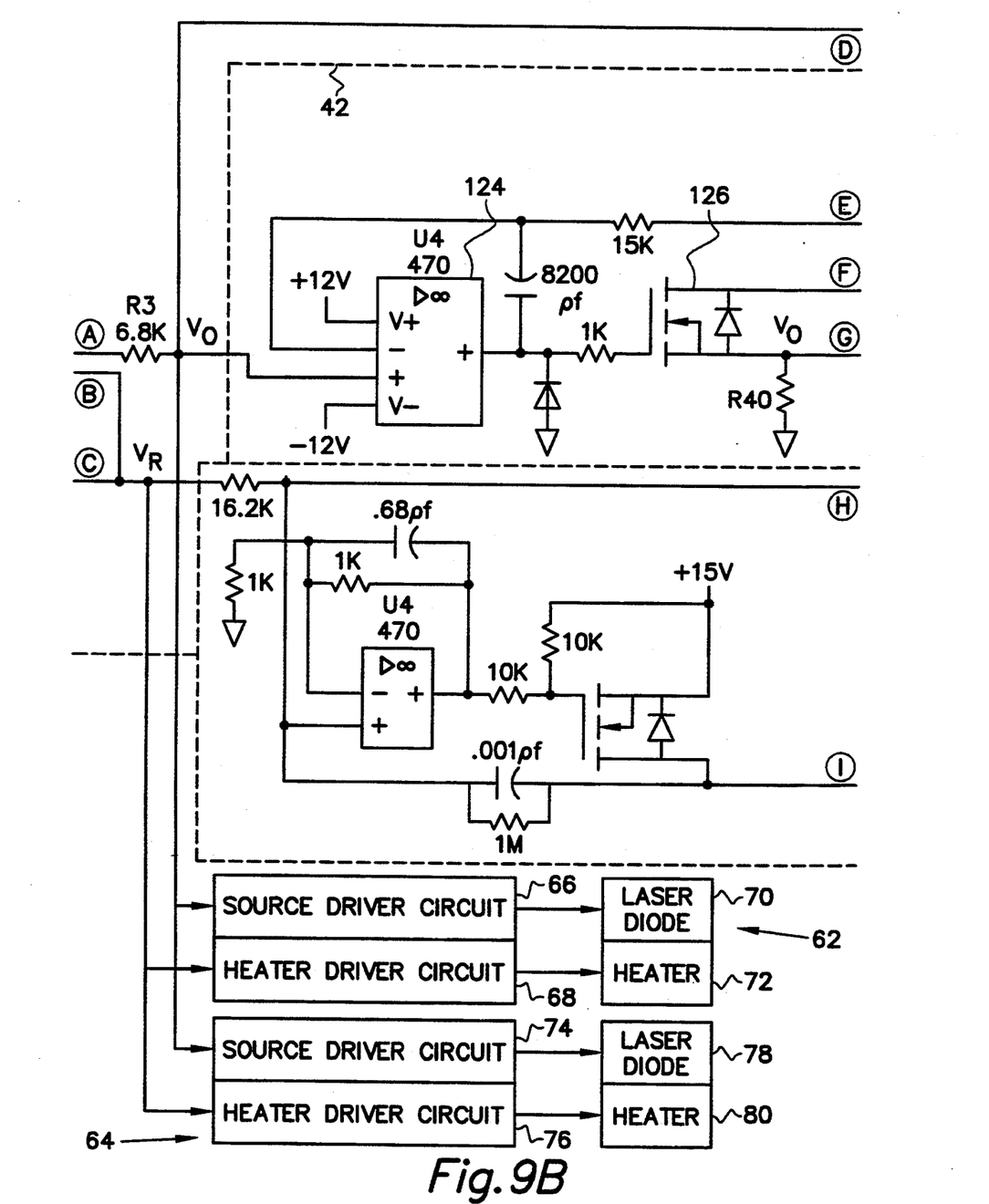
Figure 9C:
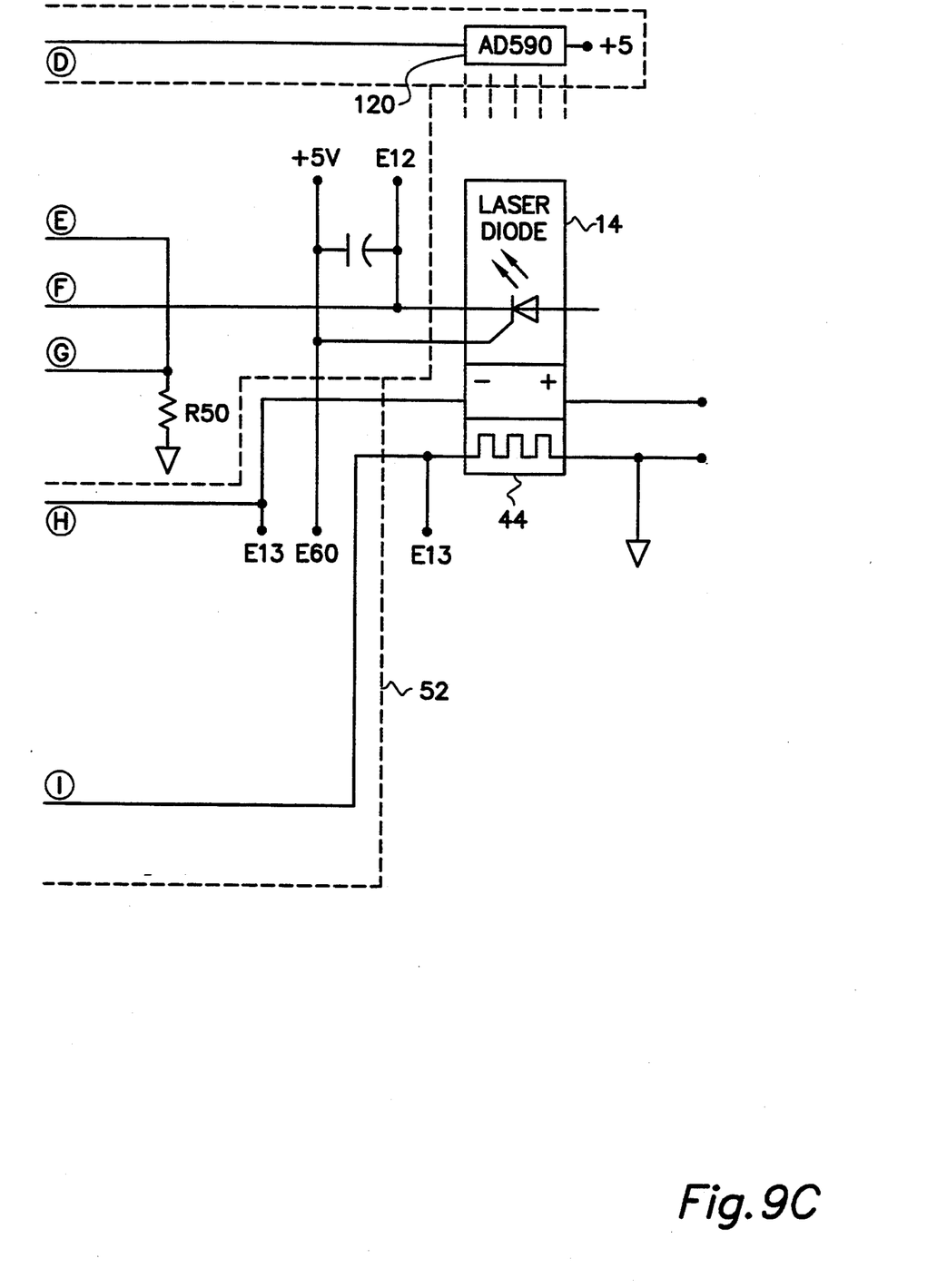

FIG. 9 shows another implementation of the light source 12 of the present invention. Light source 12 may be mounted with several other sources 62, 64 on one block. Source 62 includes source driver 66 and heater driver 68. Source driver 66 drives laser diode 70 and heater driver 68 drives heater 72. Source 64 would include source driver 74 which drives laser diode 78 and heater driver 76 for driving heater 80. The drivers of both sources 62, 64 have voltage $V_0$ as the input for the source drivers 66, 74 and a second reference voltage $V_R$ for input to the heater driver 68 and 76. Each of the sources 62 and 64 is an equivalent of the source driver 42, heater driver 52, laser diode 14 and heater 44 of light source 12.

The voltage control circuitry 40 which includes the temperature sensor 120 provides the voltage $V_0$ to each of the source drivers 42, 66 and 74 and reference voltage $V_R$ to each of the heater drivers 52, 68, and 76. It should be readily apparent that the heater could be a thermal foil heater and that only one heater could be used for the entire block rather than three separate heaters, 44, 72 and 80. In addition, one skilled in the art will recognize that a thermo-electric cooler can also be utilized to stabilize the temperature of the laser diode. Both the heaters and/or cooler utilize feedback for control thereof. Light source 12 shows a more detailed schematic of the light source of in FIG. 4. The voltage drive circuitry 40 includes temperature sensor 120 having a supply voltage of 5 volts applied thereto for generating a current in accordance with the temperature of laser diode 14 to be sunk through resistor R3, a 6.8 k ohms resistor, into buffer 122. A voltage regulator 130 in conjunction with the 10K resistor R26, the 0.1$\mu f$ capacitor across the 10K resistor, the $-12$ volt supply, the 3.32K resistor R27, the 82K resistor R29, and the 0.006 $\mu f$ capacitor C20 across the voltage regulator produces a voltage $V_1$ of $-0.54$ volts for input to buffer 122. An appropriate voltage is input to operational amplifier 132 for generating a voltage $V_R$ for input to the heater drive circuit 52.

Voltage $V_0$ is applied to operational amplifier 124 which forces $V_0$ to appear at the output of power FET 126. The power FET is an IRFR9020 with a diode thereacross for overload protection. Feedback of $V_0$ to the inverting input of operational amplifier 124 is provided via the 15K resistor and 8200 pf capacitor. The 8200 pf capacitor could also be positioned across the 15K resistor. Resistors R40 and R50 are selected to produce a 25 ohm resistance for producing a source drive current $I_f$ for laser diode 14 equal to $V_0/25$ ohms. The temperature sensor 120 is thermally coupled to the laser diodes 14, 70, 78.

The heater driver 52 is similar to the source driver 42 and is shown in FIG. 9. Further discussion thereof is limited as driver circuits are readily known to one skilled in the art.

Those skilled in the art will recognize that only preferred embodiments of the present invention have been disclosed herein, that other advantages may be found and realized, and that various modifications may be suggested by those versed in the art. It should be understood that the embodiment shown herein may be altered and modified without departing from the true spirit and scope of the invention as defined in the accompanying claims.

What is claimed is:

1. A light source apparatus for a fiber optic rotation sensor, said apparatus comprising:

a light source to provide light for input to the fiber optic rotation sensor;

source control means for generating a source control signal representative of a temperature of said light source;

drive means for generating a drive signal as a function of said source control signal to drive said light source; and means for generating one of a plurality of scale factors for the fiber optic rotation sensor as a function of said source control signal over a predetermined temperature range; and wherein said source control means comprises:
a temperature sensor providing a current signal representative of said temperature of said light source; and
a buffer network for sinking said current signal and for generating a source control voltage as said source control signal.

2. An apparatus according to claim 1, wherein said buffer network includes a buffer having an output with a first selected impedance connected between said output and an input of said drive means and a non-inverting input having a selected voltage applied thereto, said source control voltage substantially equal to a voltage across said first selected impedance as said current signal is sunk in said buffer and said selected voltage.

3. An apparatus according to claim 2, wherein said drive means includes said input for receiving said source control voltage; and means for forcing and providing said source control voltage at an output of said drive means and across a second selected impedance connected to ground to generate a drive current as said drive signal for driving said light source, said first and second selected impedances and said selected voltage being determined as a function of predetermined first and second set point temperatures defining said predetermined temperature range and predetermined drive currents for said set point temperatures.

4. An apparatus according to claim 3, wherein said forcing means includes:
an op amp having an inverting input, a non-inverting input and an output, said non-inverting input being said input of said drive means for receiving said source control voltage;
a transistor connected to said output of said op amp, said light source and said second selected impedance to provide said source control voltage at an output thereof and across said second selected impedance, to provide said drive current therethrough for driving said light source, and to provide feedback to said inverting input of said op amp.

5. An apparatus according to claim 1, wherein said generation means includes:
an analog to digital converter for converting said source control signal to a digitized signal;
computer means for receiving said digitized signal and generating one of a plurality of scale factors based on a plurality of temperatures of said light source for a plurality of rotation rates of the fiber optic rotation sensor as a function of said digitized signal representative of said source control signal.

6. An apparatus according to claim 1, further comprising a heat source for heating or a thermo-electric cooler for cooling said light source to stabilize said light source to a particular temperature.

7. An apparatus according to claim 1, wherein said light source is a laser diode.

8. A light source apparatus for a fiber optic rotation sensor, said apparatus comprising:
a light source to provide light for input to the fiber optic rotation sensor;
source control means for generating a source control signal representative of the temperature of the light source; and drive means for generating a drive signal as a function of said source control signal to drive said light source, wherein said light source is substantially immediately turned on by said drive signal upon excitation of said apparatus, said source control means preventing said drive signal from exceeding a predetermined safe maximum current whether said light source is at a low temperature or high temperature of a predetermined temperature range; and wherein said source control means comprises:
a temperature sensor providing a current signal representative of said temperature of said light source substantially immediately upon excitation of said apparatus relative to said remainder of said source control means; and
a buffer network for sinking said current signal and for generating a source control voltage as said source control signal, said buffer network includes a buffer having an output with a first selected impedance connected between said output and an input of said drive means and a non-inverting input having a selected voltage applied thereto, said source control voltage substantially equal to a voltage across said first selected impedance as said current signal is sunk in said buffer and said selected voltage.

9. An apparatus according to claim 8, wherein said drive means includes said input for receiving said source control voltage; and means for forcing and providing said source control voltage at an output of said drive means and across a second selected impedance connected to ground to generate a drive current as said drive signal for driving said light source, said first and second selected impedances and said selected voltage being determined as a function of predetermined first and second set point temperatures defining said predetermined temperature range and predetermined drive currents for said set point temperatures.

10. A method of light source wavelength compensation for a fiber optic rotation sensor, said method comprising the steps of:
providing a light source;
sensing a temperature of said light source and generating a source control signal representative thereof;
applying a drive signal to said light source as a function of said source control signal; and
generating a scale factor for said fiber optic rotation sensor as a function of said source control signal; and
wherein said temperature sensing and source control signal generating seep includes the steps of:
generating a current signal representative of the temperature of said light source;
sinking said current signal into a buffer network through a first selected impedance; and
generating a source control voltage as said source control signal as a function of said voltage across said first selected impedance and a selected voltage of said buffer network.

11. A method according to claim 10, wherein said drive signal applying step includes the step of driving said light source with a drive signal generated by application of said source control voltage across a second selected impedance.

12. A method according to claim 11, wherein said first selected impedance, said second selected impedance, and said selected voltage are chosen for a temperature range having a lower and upper set point allowing for fast turn-on of said light source with a drive signal that does not exceed a predetermined maximum drive signal for said light source of either said lower or upper set point.

13. A method according to claim 10, wherein said scale factor generation step includes the steps of:

converting said source control signal to a digitized signal;

generating one of a plurality of scale factors based on a plurality of temperatures of said light source for a plurality of rotation rates of the fiber optic rotation sensor as a function of said digitized signal.

* * * * *

UNITED STATES PATENT AND TRADEMARK OFFICE
CERTIFICATE OF CORRECTION

PATENT NO. : 5,410,515
DATED : April 25, 1995
INVENTOR(S) : MICHAEL S. BIELAS, RUDOLF C. DANKWORT It is certified that error appears in the above-indentified patent and that said Letters Patent is hereby corrected as shown below:

Column 12, Line 52, delete "seep" and replace with --step--

Signed and Sealed this

Eleventh Day of June, 1996

Attest:

BRUCE LEHMAN

Attesting Officer          *Commissioner of Patents and Trademarks*